(12) United States Patent
Koehler et al.

(10) Patent No.: US 8,135,960 B2
(45) Date of Patent: Mar. 13, 2012

(54) MULTIPROCESSOR ELECTRONIC CIRCUIT INCLUDING A PLURALITY OF PROCESSORS AND ELECTRONIC DATA PROCESSING SYSTEM

(75) Inventors: Thomas Koehler, Holzgerlingen (DE); Thomas Fuchs, Bietigheim-Bissingen (DE); Ulrich Mayer, Weil im Schoenbuch (DE); Chung-Lung Kevin Shum, New York, NY (US); Scott Barnett Swaney, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/248,549

(22) Filed: Oct. 9, 2008

(65) Prior Publication Data

US 2009/0113212 A1   Apr. 30, 2009

(30) Foreign Application Priority Data

Oct. 30, 2007   (EP) ..................................... 07119612

(51) Int. Cl.
*G06F 12/14* (2006.01)
(52) U.S. Cl. ........................................... 713/189; 726/2
(58) Field of Classification Search .......... 713/154–156, 713/168–171, 182; 726/1, 3, 11–15, 36; 380/249–250
See application file for complete search history.

(56) References Cited

U.S. PATENT DOCUMENTS

| | | | | |
|---|---|---|---|---|
| 6,378,072 B1* | 4/2002 | Collins et al. | ................. | 713/187 |
| 7,873,837 B1* | 1/2011 | Lee et al. | ...................... | 713/189 |
| 2002/0004904 A1* | 1/2002 | Blaker et al. | .................. | 713/190 |
| 2002/0004905 A1* | 1/2002 | Davis et al. | ................... | 713/193 |
| 2002/0199040 A1* | 12/2002 | Irwin et al. | ...................... | 710/22 |
| 2004/0107284 A1* | 6/2004 | Koperda et al. | ............... | 709/229 |
| 2004/0143710 A1* | 7/2004 | Walmsley | ..................... | 711/144 |
| 2007/0260934 A1* | 11/2007 | Smith et al. | ..................... | 714/43 |
| 2008/0059799 A1* | 3/2008 | Scarlata | ........................ | 713/176 |

OTHER PUBLICATIONS

T. J. Slegel et al., The IBM eServer z990 Microprocessor, IBM J. Res. & Dev. vol. 48 No. 3/4 May/Jul. 2004, pp. 295-309.

* cited by examiner

*Primary Examiner* — Kambiz Zand
*Assistant Examiner* — Fahimeh Mohammadi
(74) *Attorney, Agent, or Firm* — Adam Steadman; Cynthia Seal

(57) ABSTRACT

A multiprocessor electronic circuit and an electronic data processing system comprising such circuit are disclosed for reducing the power consumption and the chip area consumption of a multiprocessor system having cryptographic functionality. In one embodiment, the multiprocessor electronic circuit comprises a plurality of processors, a single cryptographic processing unit that comprises a plurality of input/output buffer pairs and two cryptographic engines, a cipher engine and a hash engine, and associated control logic.

8 Claims, 4 Drawing Sheets

PRIOR ART    FIG. 1A

MULTIPROCESSOR ELECTRONIC CIRCUIT INCLUDING A PLURALITY OF PROCESSORS AND ELECTRONIC DATA PROCESSING SYSTEM

RELATED APPLICATION

This application claims priority under 35 U.S.C. §119 to European Patent Application No. 07119612.5 filed Oct. 30, 2007, the entire text of which is specifically incorporated by reference herein.

BACKGROUND OF THE INVENTION

1. Field of the Invention

The various embodiments described herein relate to the field of multiprocessor computer systems and particularly to such systems including cryptographic processing units (i.e., crypto units), which are co-processor units dedicated for encrypting data after and decrypting data before processing by one of multiple processors.

2. Description and Disadvantages of the Prior Art

A typical example of the aforementioned multiprocessor computer systems is disclosed in IBM Journal of Research and Development, Volume 48, No. 3/4, May/July, 2004, pages 295-309. On page 299 thereof, an overview diagram of a prior art IBM eServer z990 processor is provided.

FIG. 1A illustrates an overview of the most basic structural components of such prior art multiprocessor computer system.

In this prior art cryptographic co-processor technology, each microprocessor core 12 includes a crypto unit 14 that implements clear key cryptographic engines in order to efficiently execute the most frequently-used cryptographic functions.

Generally, in this particular prior art, a cryptographic processing unit (i.e., crypto unit) comprises a cipher engine and a hash engine.

With increasing enhancements of processor performance, increasing numbers of cooperating processor cores, and steadily increasing cryptographic functionality as is demanded by steadily increasing cryptographic needs during instruction processing, an increasing amount of chip area and static power is required in order to provide such cryptographic functions on a processor chip according to the prior art, since in the prior art a crypto unit is required for each processor core. This 1:1 crypto unit to processor core relationship is required in order to manage the tight cooperation between a respective processor core 12 and a corresponding crypto unit 14, particularly in order to manage profound errors.

However, it is desired to keep the chip area consumption and the static power consumption of a multiprocessor system within some tolerable range, even with an increasing number of processor cores present in a single multiprocessor chip system.

OBJECTIVES OF THE INVENTION

It is thus an objective of the various embodiments described herein to reduce the power consumption and the chip area consumption of a multiprocessor system that includes cryptographic functionality.

SUMMARY OF THE INVENTION

This objective is achieved by the features provided in the enclosed independent claims. Further advantageous arrangements and exemplary embodiments are set forth in the respective dependent claims. Reference should now be made to the appended claims.

The advantages of the various embodiments described herein are achieved by a cryptographic processing unit (i.e., crypto unit) with two cryptographic engines, a cipher engine (for ciphering or deciphering) and a hashing engine (for secure hashing), each of which may operate independently from each other and may be shared among multiple processor cores.

According to the broadest aspects of the various embodiments described herein, a multiprocessor electronic circuit is disclosed. The multiprocessor electronic circuit comprises a plurality of processors and further comprises a single crypto unit comprising a plurality of input/output buffer pairs that store source data issued from and target data to be transmitted to the plurality of processors and further comprising two cryptographic engines, a cipher engine and a hash engine, wherein the functional steps performed in either the cipher engine or the hash engine are performed independently from each other. Additionally, the circuit comprises control logic for connecting the crypto unit and the plurality of processors and for temporarily assigning the crypto unit to one of the plurality of processors.

The disclosed method and system may be used for sharing a crypto unit between more than two processor cores, as is described in accordance with an exemplary embodiment herein. In such embodiment, multiplexer circuits may connect to further processor cores, and a respectively higher number of input/output buffers may be provided.

Thus, the multiprocessor system according to the various embodiments described herein provides a crypto unit that may be shared among multiple (i.e., two or more) processor cores, the crypto unit comprising two separate cryptographic engines, a cipher engine for ciphering/deciphering and a hash engine for secure hashing, wherein the two separate cryptographic engines may be assigned independently from each other to any of the multiple processor cores and may be designed to be operated independently from and concurrently with each other. The sharing of the crypto unit and its two cryptographic engines among multiple processor cores is based on the detection that there are no cases in which one processor core would require both crytographic engines concurrently.

In addition to the two cryptographic engines, there may be a dedicated set of input/output buffers available in the crypto unit for every processor core that participates in sharing. For example, these buffers each may be of size 32×8 bytes. Multiplexers from the input buffers and to the output buffers are gated based on the actual assignment of the cryptographic engines to processor cores.

The sharing of cryptographic engines among multiple processor cores may reduce chip area and static power. Generally, sharing resources may add complexity on multiple levels of the system hierarchy, but such complexity may be minimized and limited to the crypto unit itself.

Generally, the method of the various embodiments described herein allows sharing of multiple cryptographic engines among multiple processor cores with small overhead and via reuse of existing functional components that are required for other purposes in any event (e.g., reuse of input/output buffers that are required for speed matching purposes).

The additional capabilities to handle a functional reset or the error reporting or recovery/retry menchanisms of a shared cryptographic engine may be advantageously implemented under control of the processor core to which the shared cryptographic engine is actually assigned.

Furthermore, window conditions regarding transitions of a cryptographic engine between different assignment states may be treated robustly with multiple invocations of the recovery/retry mechanism on the same processor core or on different processor cores.

BRIEF DESCRIPTION OF THE DRAWINGS

The above as well as additional objectives, features, and advantages of the various embodiments described herein will be apparent in the following detailed description.

The novel and inventive features of the various embodiments are set forth in the appended claims. Exemplary embodiments and advantages thereof will be best understood by reference to the following detailed description of exemplary embodiments in conjunction with the accompanied drawings, wherein:

FIG. 1A illustrates an overview of the most basic structural components of a prior art multiprocessor system used for a prior art method;

DETAILED DESCRIPTION

Figure 1B:
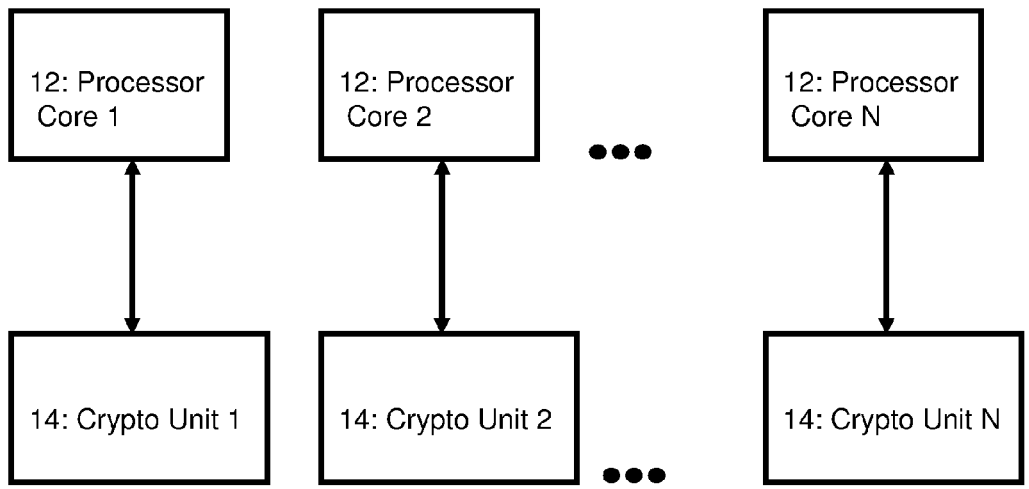
FIG. 1B illustrates an overview of the most basic structural components of a multiprocessor system, including a shared cryptographic processing unit (i.e., crypto unit), in accordance with an exemplary embodiment.
Figure 1B:
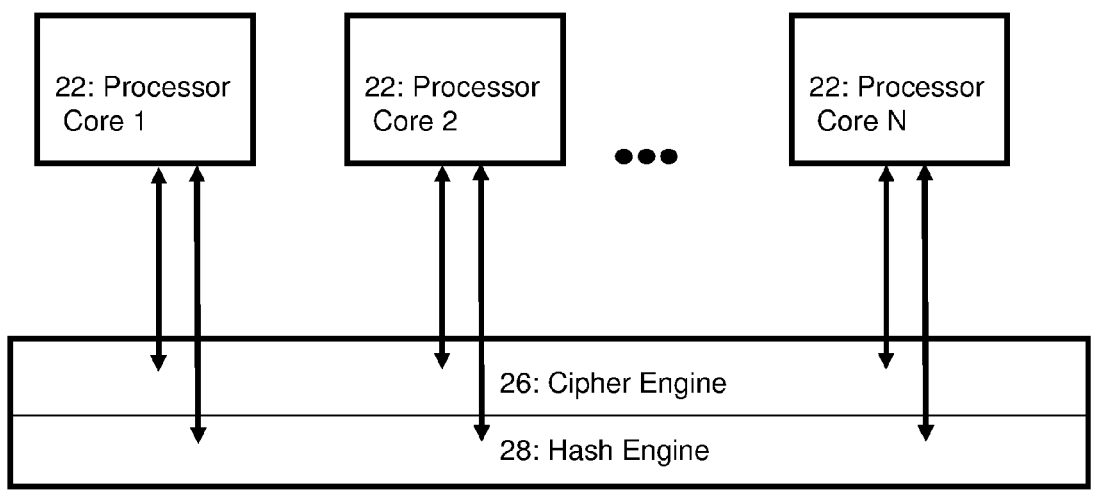

With general reference to the figures and with special reference now to FIG. 1B, in accordance with an exemplary embodiment, a cryptographic processing unit (i.e., crypto unit) 20 is shared between two or more processor cores 22A, 22B, . . . 22N. Notably, more than two processor cores may share the crypto unit 20. The crypto unit 20 is separated physically into two cryptographic engines dedicated to respective main tasks of cryptographic functionality: a cipher engine 26 for ciphering/deciphering and a hash engine 28 for secure hashing.

Figure 2:
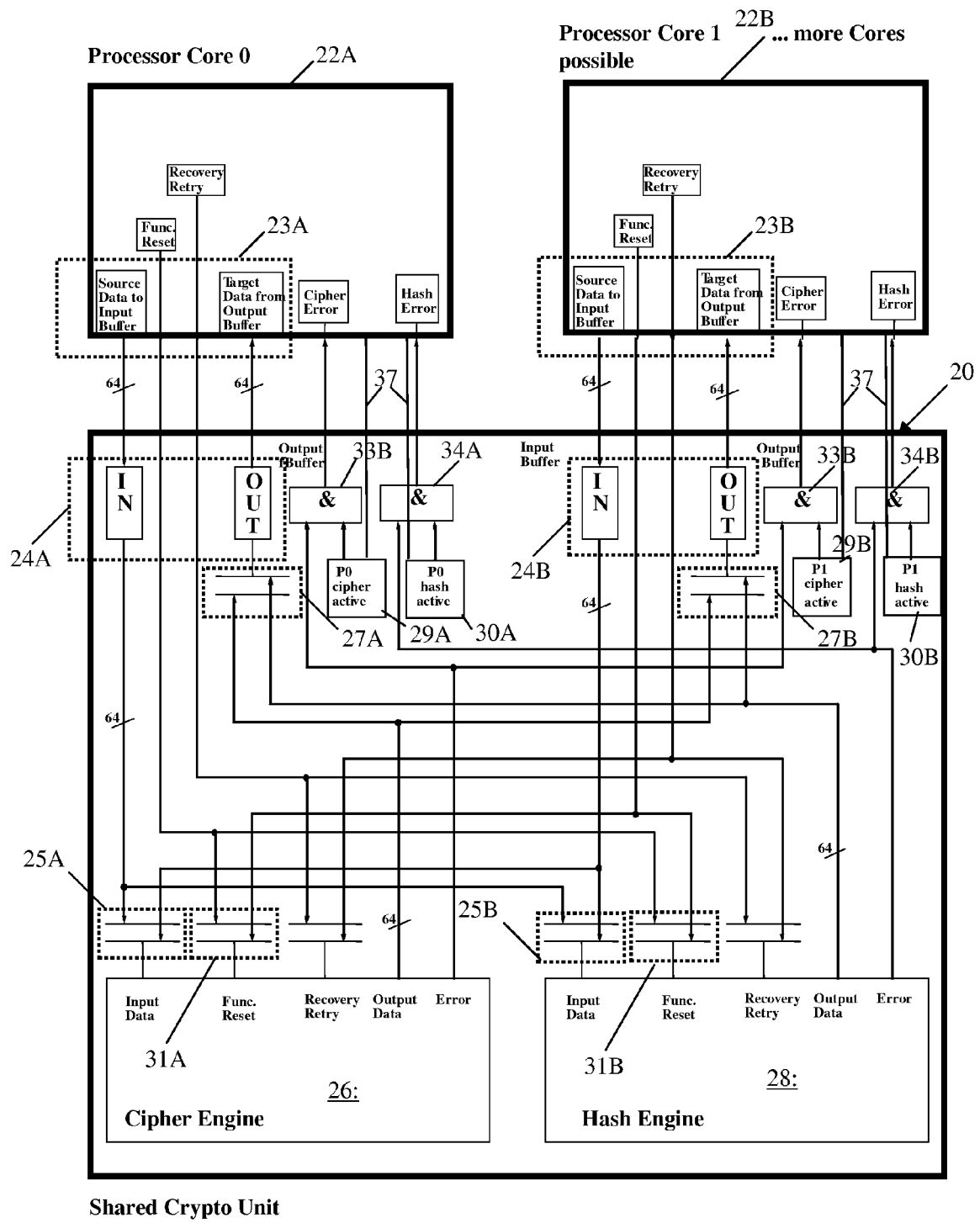
FIG. 2 illustrates the structural components of a multiprocessor core system in greater detail in accordance with an exemplary embodiment.

With reference to FIG. 2, in accordance with an exemplary embodiment, the crypto unit 20 may be shared between the processor cores 22A, 22B (while FIG. 2 explicitly depicts two processor cores, there may be more than two processor cores, as mentioned above and illustrated in FIG. 1B). Cipher engine 26 and hash engine 28 may be assigned independently from each other to any of the processor cores. It should be noted that there are no cases where one processor core would require both cryptographic engines concurrently.

In addition to the shared cryptographic engines 26, 28, there is a dedicated set of input/output buffers 24A, 24B available in the crypto unit for each processor core 22A, 22B. In an exemplary implementation, these buffers each may be of size 32×8 bytes. Multiplexers 25A, 25B from the input buffers and multiplexers 27A, 27B from to the output buffers are gated based on the actual assignment of the cryptographic engines 26 and 28 to the processor cores. Thus, the cipher engine 26 and the hash engine 28 may be controlled such that both cryptographic engines may be operated independently from and (if required) concurrently with each other.

During execution of a cryptographic operation, a respective processor core 22A, 22B may be sending source data to its associated, hard-wire connected input buffer 24A, 24B and alternately may be retrieving target data from its associated, hard-wire connected output buffer 24A, 24B.

When the respective processor core 22A, 22B is ready to execute a cryptographic instruction, it may send a command to the crypto unit 20, which may identify the type of cryptographic operation and indicate which of the two cryptographic engines 26, 28 is needed for this operation. Then, the respective processor core 22A, 22B may send the source data associated with the cryptographic operation to the respective input buffer 24A, 24B. Depending on the operation type, one of the cryptographic engines 26, 28 may be assigned to the respective processor core 22A, 22B (assuming that it is not already assigned to the alternate processor core); may fetch the source data from the respective input buffer 24A, 24B; may perform the specified cryptographic operation on this data; and may send the target data to the respective output buffer 24A, 24B, where it can be made available for retrieval by the respective processor core 22A, 22B.

The respective processor core 22A, 22B may be servicing alternately either the respective input buffer or the respective output buffer and thus may keep the assigned cryptographic engine 26, 28 continuously running throughout the cryptographic instruction. When there is no more source data available for the current instruction, the respective processor core 22A, 22B may send an indication to the crypto unit 20 after the last unit of source data has been transferred to the respective input buffer. At this point in time, the assigned cryptographic engine 26, 28 may continue to process source data from the respective input buffer until the respective input buffer is empty, may send the target data to the respective output buffer, and then may be released immediately from the respective processor core 22A, 22B. Subsequently, the newly-released cryptographic engine 26, 28 now may be available for assignment to another cryptographic operation on any of the processor cores.

When the respective input buffer has been completely filled and the respective output buffer is completely empty, the respective processor core may be merely in the process of waiting for a cryptographic engine 26, 28 to complete the current unit of operation. This wait condition may occur frequently, since complex cryptographic processing to be performed inside the cryptographic engines generally consumes more time than the buffer handling process of the respective processor core.

When a cryptographic instruction on a respective processor core 22A, 22B requires a certain cryptographic engine 26, 28 to be assigned, and the cryptographic engine necessary to process the instruction is already processing data for the respective processor core or is currently assigned to another processor core, the respective processor core may fill up the respective input buffer and then wait, with the respective input buffer full and the respective output buffer empty, for the required cryptographic engine to become available. It makes no difference for the respective processor core whether it waits while the required cryptographic engine is processing data for the respective processor core itself, or whether it waits while the cryptographic engine is still assigned to another processor core. The respective processor core merely waits for target data to become available in the respective output buffer and for empty space to become available in the respective input buffer. Hence, due to this control, the sharing of the crypto unit 20 is transparent to the processor cores from a functional perspective.

The interrupt handling and interrupt latency in accordance with an exemplary embodiment now will be described in more detail.

A respective processor core 22A, 22B may be susceptible to asynchronous interrupts each time an instruction has been completed. Before starting execution of the next instruction, the respective processor core 22A, 22B determines whether any asynchronous event is pending that requires service. When two processor cores 22A and 22B begin executing a cryptographic instruction at the same point in time and both require the same shared cryptographic engine 26, 28, then one of the processor cores should wait until the other one has completed its cryptographic operation and has released the required cryptographic engine. In this scenario, the processor core that waits for the necessary cryptographic engine may encounter an increase of interrupt latency by up to a factor of two.

To mitigate such interrupt latency, an indicator latch 29A, 29B, 30A, 30B may be provided and may be connected via a respective readline 37 to a respective processor core 22A, 22B, allowing the respective processor core waiting for data in the respective output buffer to determine whether the cryptographic engine required for its current operation is actually occupied by another processor core. When a respective processor core has filled the respective input buffer with source data and is waiting for target data in the respective output buffer, it may periodically test for pending interrupt conditions. When it finds an interrupt pending and there is still no target data available in the respective output buffer, the respective processor core then may interrogate the indicator latch and may determine whether the required cryptographic engine is currently working for another processor core. In such case, the processor core that is waiting for data may decide not to continue waiting for the busy engine, but rather may nullify the current instruction (which is possible since nothing has been stored yet and no architecture state has been changed yet by this instruction) and may service the pending interrupt instead. After servicing the interrupt, the cryptographic instruction may be executed again with a new chance to obtain the required cryptographic engine.

Next, a functional reset in accordance with an exemplary embodiment will be described in more detail. A functional reset of a cryptographic engine 26, 28 as implemented in an exemplary embodiment may include all logic except error reporting latches. As shown in FIG. 2, multiplexers 31A, 31B for functional reset may be gated such that this condition is always obtained from the processor core to which a shared cryptographic engine actually has been assigned. A respective processor core 22A, 22B may issue a functional reset at the beginning of a new cryptographic operation before sending data to the respective input buffer 24A, 24B in order to drive the cryptographic engine into a clean reset state. In addition, a functional reset issued from a processor core may be required when a complex cryptographic operation consists of multiple basic operations, each of which requiring reset of the cryptographic engine before being engaged.

When a cryptographic engine 26, 28 is assigned to a processor core 22A, 22B, the cryptographic engine may generate a functional reset by itself, since it is transparent to the respective processor core at what point in time the assignment actually happens, and any processor core 22A, 22B, ... 22N therefore does not know when to issue the functional reset.

Next, error reporting and recovery/retry will be described in accordance with an exemplary embodiment. Whenever a cryptographic engine 26, 28 detects an error condition, the respective error reporting latch may be activated, and the summary error signal to the respective processor core 22A, 22B to which the cryptographic engine is currently assigned also may become active. Consequently, the AND-gates 33A, 33B, 34A, 34B may be activated to indicate an error to the respective processor core.

The respective processor core 22A, 22B that receives the error condition may proceed through recovery/retry, which involves sending a recovery/retry signal to the crypto unit 20. The recovery/retry signal may be gated to the currently-assigned cryptographic engine 26, 28 (which should be the cryptographic engine that previously had reported the error condition) and may cause all logic, including error reporting latches, to be reset. The assignment of a cryptographic engine should not be changed during the timeframe after an error is detected inside a cryptographic engine and before the appropriate error indication is sent to the respective processor core and the recovery/retry signal in turn is sent by the respective processor core back to the cryptographic engine.

Window conditions exist when occurrence of an error or of recovery/reset falls within the transition of assignment from one processor core 22A, 22B to another processor core, or when an error is detected by a cryptographic engine 26, 28 while it is unassigned or in power save mode. These window conditions all may be treated robustly, causing a second recovery/retry on the same processor core or possibly also on the alternate processor core.

When one of the processor cores 22A, 22B is in a non-recoverable error state, other processor cores should stay operational, and the usability of a shared cryptographic engine 26, 28 by the other processor cores should not be affected. Since a defective processor core may behave unpredictably, and, for instance, may occupy a shared cryptographic engine indefinitely or drive it into "Non-Recoverable Error State", the shared cryptographic engine should no longer stay responsive to the signals from the defective processor core, and any potential assignment of the shared cryptographic engine to the defective processor core should be prevented. Such operation and the associated status are denoted as "Fencing" or "Fenced State" respectively.

The shared cryptographic engine 26, 28 according to an exemplary embodiment may determine that one of the processor cores 22A, 22B is in a "Non-Recoverable Error State" by monitoring timeout conditions or the number of recovery/retry operations within a given time interval. If a predefined threshold is exceeded, the shared cryptographic engine may enter "Fenced State" with respect to the defective processor core, in which case all signals received from the defective processor core are gated off and assignment of the shared cryptographic engine to the defective processor core is released or prevented unconditionally.

Figure 3:
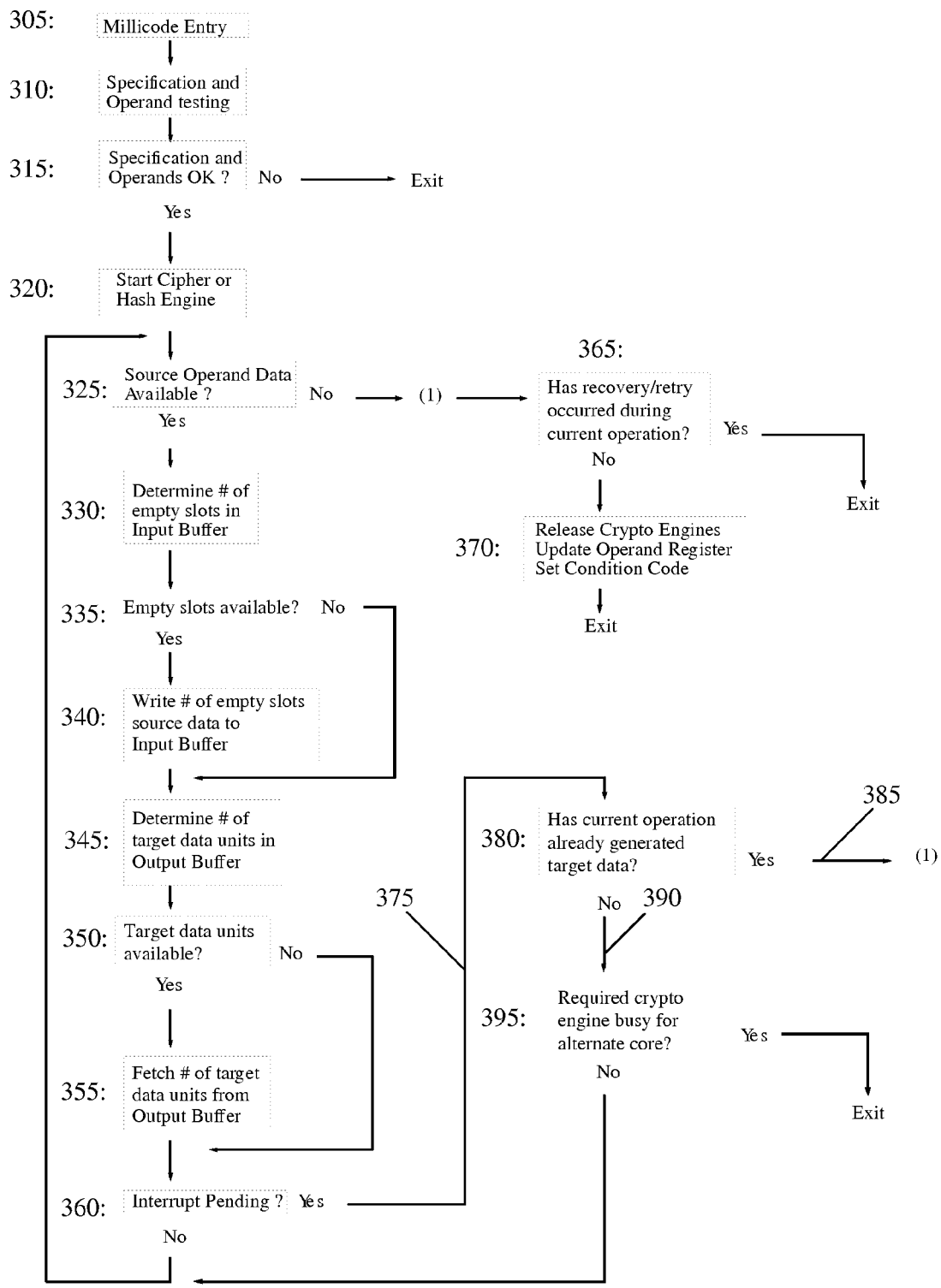
FIG. 3 illustrates the control flow of the most important steps of a method in accordance with an exemplary embodiment during cipher operation or hash operation, in a processor millicode view.

Next, a processor's millicode flow in accordance with an exemplary embodiment will be described in more detail with additional reference to FIG. 3. This is essentially the same control scheme used for all processors participating in the sharing of the two cryptographic engines 26 and 28 of the crypto unit 20.

At the beginning of a new cryptographic operation involving a respective processor core 22A, 22B sharing the crypto unit 20, the respective processor core's millicode routine for the cryptographic operation may assume the control in step 305. In steps 310 and 315, the millicode may test whether a valid function code has been selected, whether the selected function code is implemented in the respective processor core, whether the specified operand addresses are accessible, and whether the operand length is a multiple of the basic unit of operation. The basic unit of operation, the block size, differs for various cryptographic standards; for example, the block size is 8 bytes for DES, 16 bytes for AES, 64 bytes for SHA-1 and SHA-256, and 128 bytes for SHA-512.

If all such testing is successful, the cryptographic engine (cipher engine 26 or hash engine 28) required by the respective processor core 22A, 22B may be started in step 320. Then, in step 325 the required cryptographic engine may wait for data to be written into the respective input buffer 24A, 24B by the respective processor core. If there is source operand data to be processed, millicode may determine the state of the respective input buffer and the respective output buffer. In particular, millicode may determine the number of empty slots in the respective input buffer in step 330. Then, in steps 335 and 340, if there are empty slots available in the respective input buffer, the respective input buffer may be filled with source operand data units from main storage up to the number of empty slots. Subsequently, in step 345 the millicode may determine the number of target data units ready in the respective output buffer. Then, in steps 350 and 355, if there are target data units available in the respective output buffer, these data units may be stored to main memory by the millicode. Subsequently, unless there is an interrupt pending, which is tested in step 360, the millicode may branch back to the availability test of source operand data in step 325.

As long as no interrupts are pending, the millicode may remain in the process loop comprising steps 325 through 360 until all source operand data has been processed. Once all source operand data has been processed, the millicode then may test in step 365 whether recovery/retry has occurred during the entire crytographic operation. If recovery/retry has not occurred, in step 370 the millicode may complete the operation successfully and may indicate completion status in condition code and operand registers. If recovery/retry has occurred, then the operation also may be completed, but no successful completion status is indicated. The software layer above may then reissue the appropriate cryptographic instruction, and the control flow may be exited.

With reference back to step 360, if there is an interrupt pending, the millicode may exit the main processing loop, as indicated by arrow 375, and may test in step 380 whether the target data has already been generated by the cryptographic operation. If target data has already been generated (see "Yes" branch 385), then the implemented millicode may immediately complete the operation, may indicate successful ending status with "Partial Completion", and may exit the control flow. This indicates to respective control software provided by an exemplary embodiment that only a part of the required data has been processed and that the instruction should be issued again. However, software may get a chance to respond to the pending interrupt first.

Conversely, if an interrupt is pending and no target data has been generated so far (see "No" branch 390), then in step 395 it is determined whether the required cryptographic engine 26, 28 is currently busy for another processor core. If the required cryptographic engine is currently busy for another processor core, the millicode may allow the software to honor the interrupt and may complete the operation without indicating a successful completion status, since the millicode has to wait for the required cryptographic engine to become available in any event.

Figure 4:
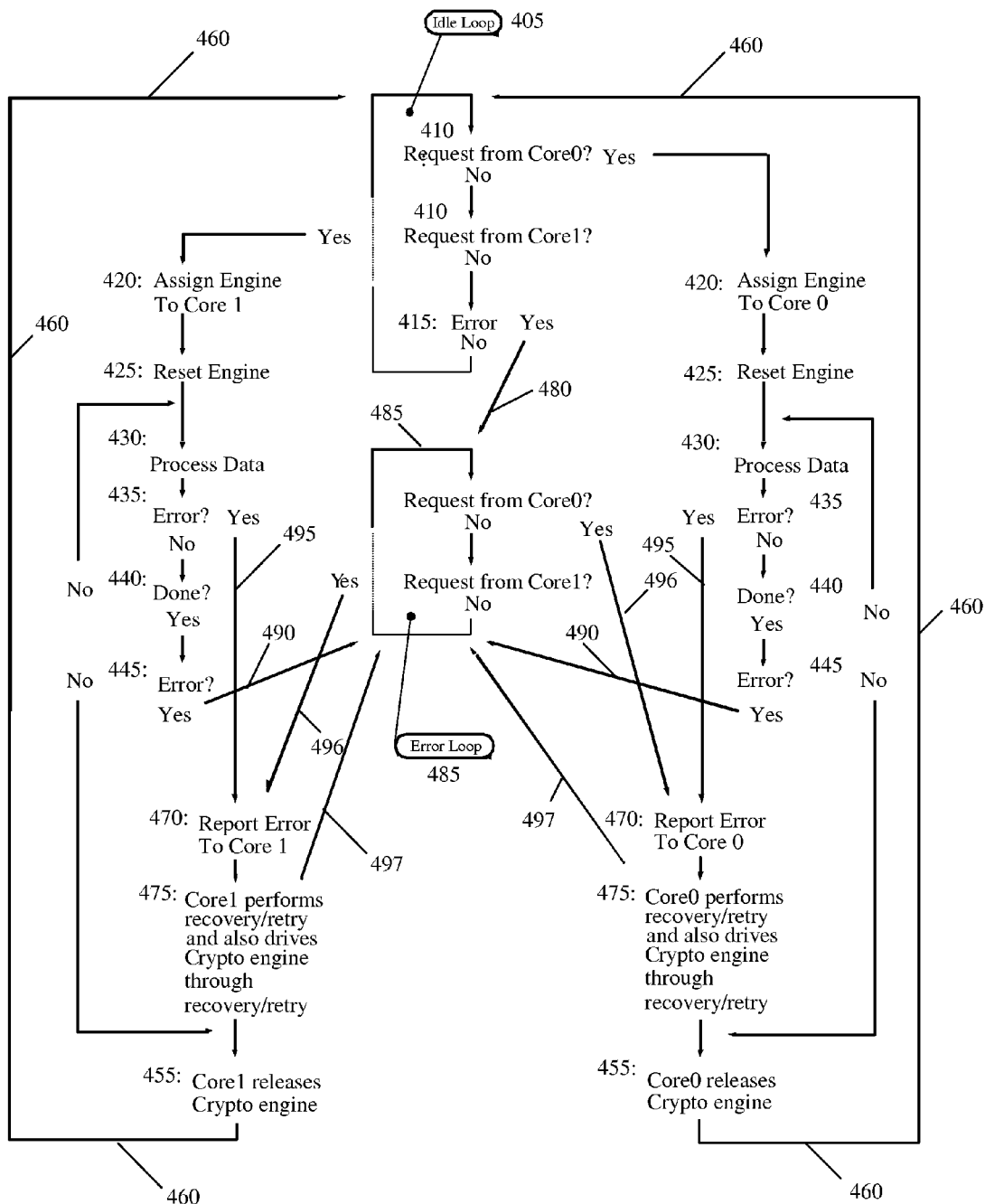
FIG. 4 illustrates the control flow of the most important steps of a method run in both the cipher engine and the hash engine in accordance with an exemplary embodiment.

Next, and with reference to FIG. 4, the operation flow in both of the shared cryptographic engines 26 and 28 in accordance with an exemplary embodiment will be described in more detail.

When no work is to be done currently by one of the cryptographic engines 26, 28, it may stay in an idle loop 405 and may test periodically for pending requests from one of the processor cores 22A, 22B and for potential internal errors (steps 410 and 415). When one of the cryptographic engines is signalled a request from a respective processor core while it is in the idle loop, the cryptographic engine may be assigned to the respective processor core (step 420) and then may perform an initial reset (step 425).

Subsequently, the cryptographic engine 26, 28 may process data for the respective processor core 22A, 22B (step 430) and periodically may test for the occurrence of an error (step 435). If no error occurs, the cryptographic engine may stay in this processing loop until all data associated with this operation has been processed. Once all data associated with this operation has been processed, the cryptographic engine then may exit the processing loop (step 440). Upon exiting the processing loop, the cryptographic engine again may test for pending error conditions (step 445), may release the cryptographic engine (step 455), and finally may enter the idle loop by performing a feedback to the idle loop 405 (path 460).

According to an exemplary embodiment, error conditions may be detected by a cryptographic engine 26, 28 at different states of operation, and upon detection of such error conditions appropriate actions may be taken.

If an error is detected in step 435 while a cryptographic engine 26, 28 is processing data, then the error may be reported to the respective processor core 22A, 22B for which it is currently working (see step 470). The respective processor core may perform recovery/retry procedures in a step 475 together with the cryptographic engine, and the error may be removed, leaving the cryptographic engine in a clean reset state. The respective processor core then may release the cryptographic engine (see step 455), which then may enter the idle loop in the feedback control (see path 460).

With reference to step 415 within idle loop 405, an error also may be detected while a cryptographic engine 26, 28 is still in the idle state and currently not assigned to any processor core 22A, 22B. No recovery/retry may be performed at this point in time, and the cryptographic engine may enter an error loop 485 in step 480 in order to wait until one of the processor cores issues a request.

When a cryptographic engine 26, 28 is in the error state at the point in time when it gets assigned to a respective processor core 22A, 22B, then the cryptographic engine should not begin processing any data but immediately may report the pending error condition to the respective processor core (see step 470), which then may go through recovery in step 475 and may release the cryptographic engine in step 455. Subsequently, the crytographic engine may return to the idle state by performing a feedback to the idle loop 405 (see path 460).

When an error is detected immediately after an exit from the processing loop (step 445), the cryptographic engine 26, 28 may not take "Yes" branch 495 through error reporting and recovery/retry but rather may go directly into the error loop (see "Yes" branch 490). However, for the respective processor core 22A, 22B, this looks like a regular completion, and the operation may be completed successfully by the millicode.

An individual skilled in the art will appreciate that there exists a timeframe wherein a control path of the "Yes" branch 495 and step 470 on one hand and the control path of steps 440 and 445 and "Yes" branch 490 on the other hand cannot be clearly separated. Specifically, an error may be detected while the cryptographic engine 26, 28 is in the process of being released from a processor core 22A, 22B, since in such case all data has been processed. In such case, this error may still be reported to the processor core as would be done along "Yes" branch 495, but when the processor then goes through recovery/retry 475, the cryptographic engine has already entered the error loop along "Yes" branch 490, causing the error to persist. In such special case, clearing the error in the cryptographic engine may occur only with the next request of one of the processor cores, which again may cause a recovery/retry 470 along "Yes" branch 496. This special situation requiring two recovery/retry operations for clearing an error in one of the cryptographic engines is depicted in FIG. 4 as a transition along path 497.

The various embodiments described herein may assume the form of an entirely hardware embodiment, an entirely software embodiment, or an embodiment containing both hardware and software elements. An exemplary embodiment may be implemented in software, which may include but is not limited to firmware, resident software, microcode, etc.

Furthermore, the various embodiments may assume the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disc—read only memory (CD-ROM), compact disc—read/write (CD-R/W), and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code should be retrieved from bulk storage during execution.

Input/output (I/O) devices (including but not limited to keyboards, displays, pointing devices, etc.) may be coupled to the system either directly or through intervening I/O controllers.

Network adapters may also be coupled to the system to enable the data processing system to become coupled to other data processing systems, remote printers, and/or storage devices through intervening private or public networks. Modems, cable modems, and Ethernet cards are just a few of the currently available types of network adapters.

The circuit as described above is part of the design for an integrated circuit chip. The chip design may be created in a graphical computer programming language and may be stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design then may be converted into the appropriate format (e.g., GDSII) for the fabrication of photolithographic masks, which typically include multiple copies of the chip design in question that are to be formed on a wafer. The photolithographic masks may be utilized to define areas of the wafer (and/or the layers thereon) to be etched or otherwise processed.

The invention claimed is:

1. A multiprocessor electronic circuit comprising:
a plurality of processors;
a single cryptographic processing unit comprising a plurality of input/output buffer pairs storing source data issued from and target data to be transmitted to the plurality of processors and further comprising two cryptographic engines, a cipher engine and a hash engine, wherein an assignment of one of the two cryptographic engines to one of the plurality of processors is performed independently from an assignment of the other of the two cryptographic engines; and
control logic for connecting the cryptographic processing unit to the plurality of processors and for temporarily assigning one of the two cryptographic engines to one of the plurality of processors.

2. The multiprocessor electronic circuit according to claim 1, wherein the cryptographic processing unit performs a reset procedure independently of each of the plurality of processors.

3. The multiprocessor electronic circuit according to claim 1, further comprising an indicator latch including a readline connected to one of the plurality of processors, wherein the indicator latch allows the processor to determine whether one of the two cryptographic engines is currently assigned to another of the plurality of processors.

4. The multiprocessor electronic circuit according to claim 1, further comprising control logic for performing at least one of:
a functional reset of the cryptographic processing unit or one of the two cryptographic engines,
error reporting,
a recovery/retry mechanism,
error reporting and handling for errors occurring during a transition of assignment of one of the two cryptographic engines, and
error reporting handling due to a power save status of the cryptographic processing unit.

5. An electronic data processing system comprising a multiprocessor electronic circuit, the multiprocessor electronic circuit comprising:
a plurality of processors;
a single cryptographic processing unit comprising a plurality of input/output buffer pairs storing source data issued from and target data to be transmitted to the plurality of processors and further comprising two cryptographic engines, a cipher engine and a hash engine, wherein an assignment of one of the two cryptographic engines to one of the plurality of processors is performed independently from an assignment of the other of the two cryptographic engines the; and
control logic for connecting the cryptographic processing unit to the plurality of processors and for temporarily assigning one of the two cryptographic engines to one of the plurality of processors.

6. The electronic data processing system according to claim 5, wherein the cryptographic processing unit performs a reset procedure independently of each of the plurality of processors.

7. The electronic data processing system according to claim 5, wherein the multiprocessor electronic circuit further comprises an indicator latch including a readline connected to one of the plurality of processors, wherein the indicator latch allows the processor to determine whether one of the two cryptographic engines is currently assigned to another of the plurality of processors.

8. The electronic data processing system according to claim 5, wherein the multiprocessor electronic circuit further comprises control logic for performing at least one of:
- a functional reset of the cryptographic processing unit or one of the two cryptographic engines,
- error reporting,
- a recovery/retry mechanism,
- error reporting and handling for errors occurring during a transition of assignment of one of the two cryptographic engines, and
- error reporting handling due to a power save status of the cryptographic processing unit.

* * * * *